United States Patent
Auvil et al.

(10) Patent No.: US 11,820,922 B2
(45) Date of Patent: Nov. 21, 2023

(54) ADHESIVE COMPOSITION

(71) Applicant: DDP SPECIALTY ELECTRONIC MATERIALS US, LLC, Wilmington, DE (US)

(72) Inventors: Tyler Auvil, Auburn Hills, MI (US); Gary L. Jialanella, Oxford, MI (US); Eric E. Cole, Auburn Hills, MI (US); Felix Koch, Freienbach (CH); Andreas Lutz, Freienbach (CH); Daniel Schneider, Freienbach (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 414 days.

(21) Appl. No.: 16/649,361

(22) PCT Filed: Oct. 2, 2018

(86) PCT No.: PCT/US2018/053867
§ 371 (c)(1),
(2) Date: Mar. 20, 2020

(87) PCT Pub. No.: WO2019/079026
PCT Pub. Date: Apr. 25, 2019

(65) Prior Publication Data
US 2020/0231849 A1    Jul. 23, 2020

Related U.S. Application Data

(60) Provisional application No. 62/573,816, filed on Oct. 18, 2017.

(51) Int. Cl.
| | |
|---|---|
| *C08L 63/00* | (2006.01) |
| *C09J 163/00* | (2006.01) |
| *C08G 59/40* | (2006.01) |
| *C09J 5/06* | (2006.01) |
| *C09J 11/04* | (2006.01) |

(52) U.S. Cl.
CPC ........ *C09J 163/00* (2013.01); *C08G 59/4021* (2013.01); *C08L 63/00* (2013.01); *C09J 5/06* (2013.01); *C09J 11/04* (2013.01); *C09J 2463/00* (2013.01)

(58) Field of Classification Search
CPC ..... C09J 163/00; C09J 5/06; C09J 5/00; C09J 11/04; C09J 2463/00; C08G 59/4021; C08L 63/00; C08K 2003/2206; C08K 3/36
USPC ........................................................ 524/492
See application file for complete search history.

(56) References Cited

U.S. PATENT DOCUMENTS

| | | | |
|---|---|---|---|
| 2,739,075 A | 3/1956 | Iler | |
| 2,786,042 A | 3/1957 | Iler | |
| 4,713,432 A | 12/1987 | Bagga et al. | |
| 7,084,210 B2 | 8/2006 | Eagle | |
| 8,545,667 B2 | 10/2013 | Ammerschop et al. | |
| 2004/0131839 A1 | 7/2004 | Eagle | |
| 2016/0108297 A1* | 4/2016 | Bradley | C09J 9/00 521/135 |
| 2017/0107408 A1* | 4/2017 | Haag | C08L 63/00 |
| 2018/0251633 A1* | 9/2018 | Lutz | C08L 75/04 |
| 2021/0062054 A1* | 3/2021 | Koch | C09J 163/00 |

FOREIGN PATENT DOCUMENTS

| | | | |
|---|---|---|---|
| EP | 0197892 | 9/1987 | |
| WO | 2009058295 | 5/2009 | |
| WO | 2012006001 | 1/2012 | |
| WO | 2013141955 | 9/2013 | |
| WO | 2016108958 | 7/2016 | |
| WO | 2017044401 A1 | 3/2017 | |
| WO | 2017044402 | 3/2017 | |
| WO | WO-2017044402 A1 * | 3/2017 | C08G 18/12 |

OTHER PUBLICATIONS

Aerosil R202, coatino.com (Retrieved on Aug. 25, 2022). (Year: 2022).*

* cited by examiner

*Primary Examiner* — Hannah J Pak

(57) ABSTRACT

An epoxy-based crash durable adhesive composition including: (I) a liquid resin system comprising: (a) at least one epoxy resin; and (b) at least one toughener; wherein the viscosity of the above liquid resin system is less than about 800 Pa s at a temperature of 15° C.; and wherein the viscosity of the above liquid resin system is greater than about 5 Pa-s at a temperature of 60° C.; (II) a solid material comprising: (c) at least one hydrophobic fumed silica, wherein the fumed silica is present in the adhesive composition at a concentration of greater than 5 weight percent; and (III) a curative material comprising: (d) at least one latent heat-activated curing agent; wherein the rheology of the epoxy-based crash durable adhesive composition is such that the adhesive composition is pumpable at a temperature of 15° C. or greater; and wherein the epoxy-based crash durable adhesive composition exhibits an increase in wash-off resistance; a process for making the above adhesive composition; and a process for bonding metal substrates together with the above adhesive composition.

7 Claims, 4 Drawing Sheets

ADHESIVE COMPOSITION

FIELD

The present invention is related to a wash-off resistant epoxy-based structural adhesive composition.

BACKGROUND

In a typical automobile manufacturing process, a one-component (1K) crash durable adhesive (CDA) paste, which has not yet been cured, is robotically applied to metal panels of a vehicle. Then the metal panels are mated together and mechanically fastened or welded along a bond line to lock the panels in place. Next, the entire body of the vehicle with the metal panels (mechanically fastened together) is subjected to a series of sprays and baths to: (1) remove oil/dirt and/or (2) apply coatings to the surface of the body for corrosion prevention.

An uncured CDA should be designed to endure relatively high temperatures (for example, up to about 60° C.) and exposure to high volumes of water during the automobile manufacturing process. If the CDA fails to withstand the above conditions, the CDA will "wash-off" the vehicle body when the vehicle body is subjected to the wash/treatment baths. Then, the CDA that washes off the surface of the vehicle body will contact and contaminate the wash/treatment baths. An even bigger problem for original engineering manufacturers (OEMs) is that the washed-off CDA dispersed in the wash/treatment baths will often redeposit onto the surface of the vehicle body in a different area of the vehicle body where the washed-off CDA is not desired to be deposited. The redeposited CDA will subsequently require manual removal and repair of the vehicle body surface area where the washed-off CDA has undesirably redeposited leading to undesired wasted time and extra work. This extra work of removal and repair is required to prevent paint defects of the vehicle body surface area where the washed-off CDA has undesirably redeposited.

In addition to the need for a CDA having the appropriate rheology at high-temperatures to prevent wash-off, a CDA should have good pumpability at low temperatures, i.e., the CDA should have the rheological material properties such that the CDA is capable of being pumped at temperatures as low as 15 degrees Celsius (° C.). Most materials, including CDAs, increase exponentially in viscosity as the materials are cooled. For the above reasons, heretofore it has been a challenge by those skilled in the art to achieve the rheological properties of a CDA to minimize wash-off, while maintaining the pumpability of the CDA. Heretofore, known adhesives do not provide an acceptable wash-out resistance and are not pumpable at low temperatures. Therefore, it would be an advancement in the field of manufacturing CDAs to increase a CDA's wash-off resistance property while maintaining a CDA's rheological requirements for pumpability at low temperatures.

SUMMARY

It has been surprisingly found that by including (i) a liquid resin at a predetermined viscosity and (ii) a predetermined ratio of a hydrophobic fumed silica:liquid resin in an epoxy adhesive composition, the adhesive's wash-off resistance can be improved while maintaining its rheological requirements for pumpability at low temperatures.

The present invention is directed to an epoxy-based crash durable adhesive (CDA) composition having beneficial rheology properties. In one embodiment, the CDA composition of the present invention is pumpable at cold temperatures (e.g., less than (<) about 25° C.) and exhibits an increase in wash-off resistance at temperatures of greater than or equal to (≥) about 15° C. The cold pumpable, wash-off resistant CDA composition is provided by combining: (I) a liquid resin system; (II) a solid material, and (III) a curative material. An increase in wash-off resistance is beneficially exhibited by the adhesive at a hydrophobic fumed silica: liquid resin ratio (i.e., a component (II):component (I) ratio) of at least greater than 0.08.

In one embodiment, the liquid resin system, component (I) of the epoxy-based crash durable adhesive composition, includes, for example, (a) at least one epoxy resin; and (b) at least one toughener; and the viscosity of the liquid resin system, component (I), is <about 800 pascal-seconds (Pa·s) at a temperature of 15° C.; and greater than (>) about 5 Pa·s at a temperature of 60° C. The solid material, component (II) of the epoxy-based crash durable adhesive composition, includes, for example, (c) at least one hydrophobic fumed silica. Advantageously, the fumed silica may be present in the adhesive composition at a concentration of >about 5 weight percent (wt %). The curative material, component (III) of the epoxy-based crash durable adhesive composition, includes, for example, (d) at least one curing agent. The rheology of the resulting epoxy-based crash durable adhesive composition is such that the adhesive composition is pumpable at a temperature of 15° C. or greater.

In general, the epoxy-based crash durable adhesive composition of the present invention beneficially exhibits: (1) a rheology such that the adhesive may be pumpable when exposed to temperatures of as low as about 15° C.; and (2) a wash-off resistance such that the adhesive does not flow more than about 7 millimeters (mm) on oily metal panels when exposed to spray wash-off testing conditions.

Another embodiment of the present invention is directed to a process for making the above adhesive composition.

And yet another embodiment of the present invention is directed to a process for using the above structural adhesive composition to bond materials in automotive applications.

An objective of the present invention is to provide an adhesive product useful as a crash durable adhesive exhibiting an enhanced wash-off resistance property while maintaining the pumpability property of the adhesive at low temperatures. A preferred objective of the present invention is to provide an epoxy-based, highly wash-off (wash-out) resistant one-component (1K) crash durable adhesive (CDA) formulation with the beneficial properties of wash-off resistance and pumpability at low temperatures that can be used, for example, as a structural adhesive for the automotive industry. More particularly, the adhesive of the present invention includes preparing a heat-curable epoxy-based adhesive paste composition that is (i) capable of being easily pumped at temperatures of as low as about 15° C. and (ii) resistant to being washed off a substrate surface prior to being cured. The adhesive of the present invention advantageously can be applied to vehicle bodies such that the adhesive of the present invention does not significantly wash off from the surface of the vehicle during spray or bath treatments in a vehicle assembly plant.

DETAILED DESCRIPTION

Figure 1:
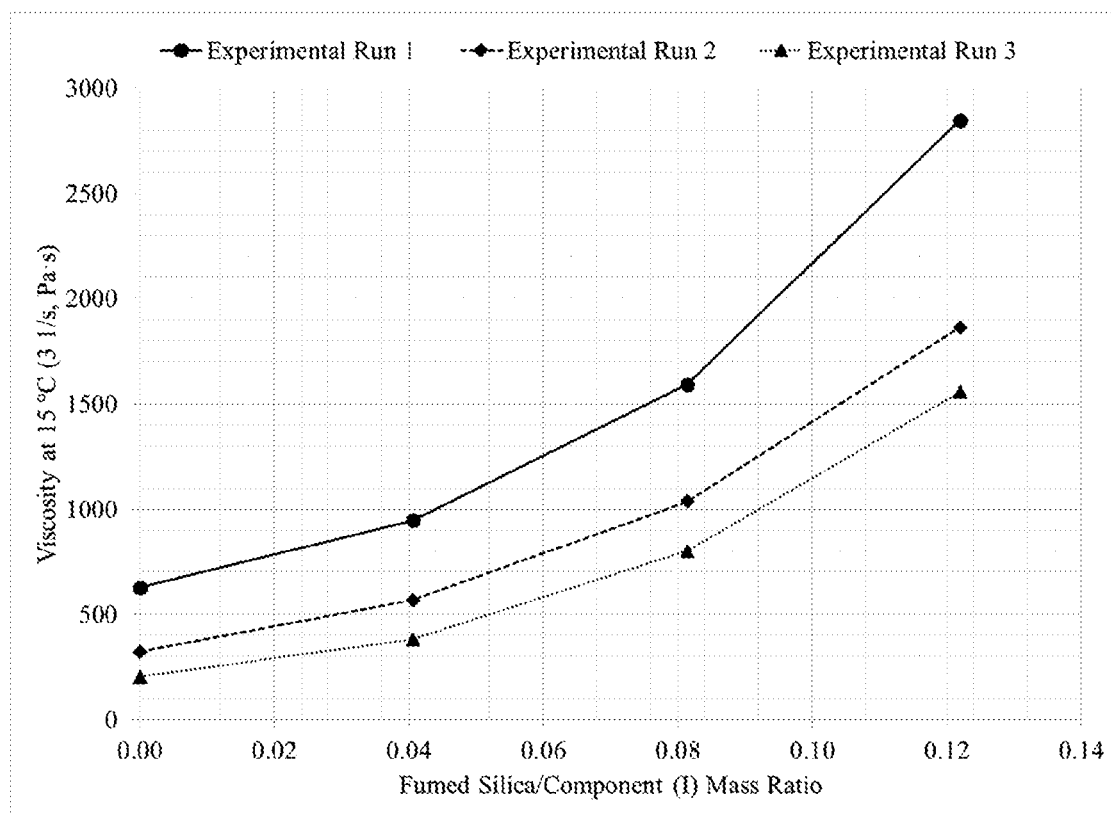
FIGS. 1 and 2 are graphic illustrations showing the effect on an adhesive resin's viscosity at 15° C. and 58° C. when a solid epoxy resin concentration in the adhesive is reduced (e.g., XZ92579), a liquid epoxy resin is incorporated (e.g., D.E.R. 331) in the adhesive resin, and a fumed silica content in the adhesive is varied.

The present invention comprises a composition useful as an adhesive and more particularly to a heat-curable epoxy-based adhesive composition that is resistant to being washed off substrate surfaces prior to being cured. The incorporation of a liquid resin, component (I), and hydrophobic fumed silica, component (II) at a controlled hydrophobic fumed silica:liquid resin ratio can significantly enhance the wash-off resistance of the adhesive, while still allowing the adhesive to be readily dispensed by pumping at low temperatures. The epoxy adhesive composition of the present invention with superior wash-off resistance may be used, e.g., in manufacturing processes, e.g., in the automobile industry.

The epoxy adhesive composition includes (I) a liquid resin system comprising: (a) at least one epoxy resin; and (b) at least one toughener; (II) a solid material comprising: (c) at least one hydrophobic fumed silica; and (III) a curative material comprising: (d) at least one curing agent; and may optionally comprise other components. The adhesive composition of the present invention can beneficially be a resin blend with a low (e.g., <about 800 Pa·s) viscosity at temperatures of ≥15° C.; the adhesive composition preferably is in the form of a paste material capable of being pumped, for example, through robotic application systems at temperatures as low as 15° C. In addition, the adhesive composition of the present invention beneficially exhibits a high wash-off resistance (e.g., such that the adhesive does not flow more than about 7 mm on oily metal panels when exposed to spray wash-off testing conditions.) at temperatures at, or below, about 60° C.

"Pumpable" or "pumpability", with reference to an adhesive composition, herein means an adhesive composition having a desired rheology such that the adhesive composition can flow and be pumped by conventional pumping means; generally, a pumpable adhesive composition herein exhibits a viscosity of <about 6,000 Pa·s at a temperature of about 15° C., preferably <about 4,500 Pa·s, and more preferably <about 3,500 Pa·s.

"Wash-off resistance" or "wash-out resistance" with reference to an adhesive composition, herein means that the adhesive composition does not wash off of oily metal panels when exposed to water temperatures at or below 60° C. and pressures at or below 50 pounds per square inch (psi) in a spray wash-off test; and does not wash out of the bond line during the manufacturing process.

"Hydrophobic material" or "a material exhibiting hydrophobicity" with reference to a solid material herein means that the solid material has been pre-treated with another separate treatment material known to be hydrophobic such as polydimethylsiloxane or octylsilane.

In one general embodiment, the present invention includes a 1K CDA composition including a combination of: (I) a liquid resin system; (II) a solid material; and (III) a curative material. The liquid resin system, component (I), can be at least one liquid component; the solid material, component (II), can be at least one solid component; and the curative material, component (III) can be at least one latent curing agent in liquid or solid form. If desired, other optional ingredients can be added to the liquid resin system, component (I), to the solid material(s), component (II), and/or to the curative material, component (III), to form the present invention adhesive composition.

In one embodiment for example, the liquid resin system, component (I), may include a combination of: (a)(i) a liquid epoxy resin or (a)(ii) a blend of a liquid resin and a solid resin; and (b) a toughener; the solid material, component (II), may include: (c), a hydrophobic fumed silica; and the curative material, component (III), may include (d) a curing agent forming an epoxy-based 1K CDA adhesive composition.

As aforementioned, other optional ingredients can be added to any one or more of the adhesive composition components (I) to (III), if desired, to form the present invention adhesive composition. For example, component (II) of the adhesive composition may optionally include (e) a filler material. On the other hand, component (I) of the adhesive composition may optionally include (f) a liquid curing accelerator; and/or (g) a liquid resin or polymer composition different from the liquid epoxy resin of component (a). The benefits exhibited by the adhesive composition of the present invention can be realized when the mass ratio of solid material, component (II) to liquid resin composition, component (I), is, for example, >about 0.08. The mass ratio is defined as mass solids/mass liquid components.

The epoxy resins, component (a), useful in the present invention may include a wide variety of curable epoxy compounds and combinations thereof; and may include liquids, and mixtures of liquids and solids provided that the resulting epoxy resin is adapted for providing a liquid resin system with a viscosity that meets the rheology characteristic of being pumpable at temperatures of down to 15° C. Also, combinations of epoxy resins may be used to adjust the properties of the epoxy-based crash durable adhesive.

The epoxy resin, component (a) of the liquid resin system, is advantageously a system that exhibits a minimal viscosity dependence on temperature. The adhesive formulation of the present invention may include, for example, one or more liquid epoxy resins as component (a); or a blend of (i) one or more liquid epoxy resins and (ii) one or more solid epoxy resins. The liquid epoxy resin useful in the present invention may include curable epoxy compounds and combinations of two or more curable epoxy compounds. The epoxy compounds may be saturated, unsaturated, cyclic or acyclic, aliphatic, alicyclic, aromatic or heterocyclic epoxy compounds. The epoxy compounds, also referred to as polyepoxides, include epoxy resins which can be monomeric (e.g., the diglycidyl ether of bisphenol A, diglycidyl ether of bisphenol F, diglycidyl ether of tetrabromobisphenol A, novolac based epoxy resins, and tris-epoxy resins); higher molecular weight resins (e.g., the diglycidyl ether of bisphenol A advanced with bisphenol A); or polymerized unsaturated monoepoxides (e.g., glycidyl acrylates, glycidyl methacrylate, allyl glycidyl ether, etc.) to homopolymers or to copolymers. Epoxy compounds contain, on average, at least one pendant or terminal 1,2-epoxy group (i.e., a vicinal epoxy group) per molecule.

Examples of suitable polyepoxides, component (a), useful in the present invention include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)-methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolac resin-type.

In one preferred embodiment, the liquid epoxy resin useful in the present invention can be derived by reaction of bisphenol A or bisphenol F and epichlorohydrin. Epoxy resins that are useful in the present invention are liquid at room temperature (e.g., diglycidyl ethers of bisphenol A are liquid at about 25° C.) generally have epoxy equivalent weights of from about 150 to about 480. Suitable epoxy resins useful in the present invention may include, for example, D.E.R. 331, D.E.R. 332, D.E.R. 383, D.E.R. 431 and D.E.R. 736, all available from Olin Corporation.

In one preferred embodiment, a liquid epoxy resin is used in the present invention and such liquid epoxy resin can have the following general formula:

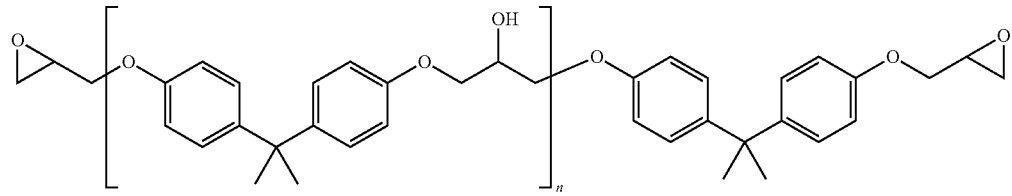

where n is generally in the range of 0 to about 25. Basic liquid epoxy resins, e.g. D.E.R. 331, have epoxy equivalent weights in the range of about 180-195 g/mol.

Other epoxy resins that may be used in the present invention may include the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other suitable epoxy resins useful in the present invention may include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Yet other useful epoxy resins may include epoxy resins derived from the epoxidation products of olefinically-unsaturated cycloaliphatic compounds or from natural oils and fats.

When a solid epoxy resin is used in combination with a liquid epoxy resin, the solid epoxy resins that may be used in the present invention can be mainly based upon bisphenol A. A preferred solid epoxy resin useful in the present invention may include a diglycidyl ether of bisphenol A such as D.E.R. 664 UE solid epoxy commercially available from Olin Corporation.

In preparing the adhesive composition of the present invention, the adhesive composition may include any amount of epoxy resin. In a preferred embodiment when only a liquid epoxy resin is used as component (a), the concentration of the liquid epoxy resin, component (a), used in preparing the liquid resin system, component (I), of the adhesive formulation of the present invention can be in the range of from about 25 wt % to about 75 wt % based on the weight of the liquid resin system, component (I), in one embodiment; from about 30 wt % to about 70 wt % in another embodiment; and from about 34 wt % to about 67 wt % in still another embodiment.

In an embodiment when a blend of a liquid and solid epoxy is used as component (a), such as for example the epoxy resin XZ92579, the concentration of the blend, component (a), used in preparing the liquid resin system, component (I), of the adhesive formulation of the present invention can be in the range of from about 50 wt % to about 85 wt % based on the weight of the liquid resin system, component (I), in one embodiment; from about 55 wt % to about 80 wt % in another embodiment; and from about 60 wt % to about 75 wt % in still another embodiment.

To prepare the liquid resin system, component (I), of the adhesive formulation of the present invention, the adhesive formulation can include one or more toughening agents also referred to as "tougheners" or "impact modifiers". In general, the toughener, component (b), of the present invention is advantageously a liquid toughening agent having a flowable viscosity such that the toughening agent can be easily handled in preparing the CDA of the present invention. The toughening agent useful in the present invention may include, for example, polyurethane (PU)-based materials; liquid rubber; epoxidized polyols; liquid rubber tougheners; core-shell rubber materials described in U.S. Pat. No. 8,545,667 B2 incorporated herein by reference; or combination thereof.

In one preferred embodiment for example, the toughener, component (b), can be a capped-polyurethane toughener that exhibits a minimal viscosity dependence on temperature. The toughener can include for example polyurethane (PU) tougheners capped with phenol compounds, cashew nut shell liquid (CNSL) or cardanol, benzoxazolinone, or epoxy compounds, such as monohydroxylated epoxide, and mixtures thereof. The capped polyurethane toughener can also include an extender such as o,o'-diallylbispenol A (ODBA).

Other tougheners, component (b), useful in the present invention may include for example, PU-tougheners derived from hexamethylene diisocyanate (HDI), polytetramethylene ether glycol (PTMEG)—chain extended with bisphenol A and capped with diisopropylamine. For example, the tougheners useful in the present invention may include the tougheners described in publication WO2016108958A1, incorporated herein by reference, as diisopropylamine capped urethanes available under the product name "RAM DIPA" from The Dow Chemical Company. Still other tougheners, component (b), useful in the present invention may include for example, blends of PTMEG and hydroxyl-terminated polybutadiene, preferably chain extended with ODBA and capped CNSL as described in publication WO2017/044402, incorporated herein by reference.

The concentration of the toughener, component (b), used in preparing the liquid resin system, component (I), of the adhesive formulation of the present invention can be in the range of from about 20 wt % to about 40 wt % based on the weight of the liquid resin system, component (I), in one embodiment; from about 23 wt % to about 37 wt % in another embodiment; and from about 25 wt % to about 35 wt % in still another embodiment.

The liquid resin system, component (I), of the present invention is advantageously a liquid resin system having a flowable viscosity such that the resin system in preparing the CDA of the present invention can be readily handled at application temperatures. For example, in one embodiment the viscosity of the liquid resin system, component (I), at a temperature of about 15° C. may be generally <about 800 Pa·s. In other embodiments, the viscosity of the liquid resin system, component (I), at a temperature of about 15° C. may be <about 400 Pa·s and <about 250 Pa·s. In still another embodiment, the viscosity of the liquid resin system, component (I), at a temperature of about 15° C. may be from about 200 Pa·s to <about 800 Pa·s.

In another general embodiment, the viscosity of the liquid resin system, component (I), is >about 5 Pa·s at a temperature of about 60° C.; >about 7 Pa·s at a temperature of 60° C. in still another embodiment; and >about 11 Pa·s at a temperature of 60° C. In yet another embodiment, the viscosity of the liquid resin system, component (I), at a temperature of about 60° C. may be from >about 5 Pa·s to about 20 Pa·s.

In preparing the adhesive formulation of the present invention, one or more solid hydrophobic materials, as component (II), can be mixed with the liquid resin system component (I). For example, the solid material can be a hydrophobic fumed silica as component (c). In one embodiment of the present invention, the adhesive contains at least one hydrophobic fumed silica. Fumed silicas are well-known thixotropic agents in the art and are available from several commercial sources, including fumed silica products sold under the CAB-O-SIL trademark by Cabot Corporation and fumed silica products sold under the AEROSIL trademark by Degussa. Hydrophobic fumed silica is fumed silica that has been reacted or treated with a compound (usually an organosilicon compound such as dimethyldichlorosilane, trimethoxyoctylsilane, polydimethylsiloxane or hexamethyldisilazane) to replace at least a portion of the hydroxyl groups on the surface of the fumed silica with other groups such as methyl groups. Specific fumed silicas useful in the present invention include, but are not limited to, CAB-O-SIL TS-720 and Cab-O-Sil ULTRABOND. In certain embodiments of the invention, the fumed silica has a BET surface area in the range of from about 80 to about 300 m²/g and/or a carbon content of from about 0.5 wt % to about 7 wt %. Desirably, the surface area of the hydrophobic fumed silica should be as high as possible.

Methods of preparing hydrophobic fumed silicas are well-known in the art and include, for example, the methods described in U.S. Pat. Nos. 2,739,075 and 2,786,042 (each of which is incorporated herein by reference in its entirety). In one preferred embodiment, the fumed silica may be a fumed silica that has been treated with a hydrophobic silane such as poly(dimethylsiloxane) (PDMS). In another embodiment, the hydrophobic fumed silica useful in the present invention may include, for example, octylsilane-treated fumed silica. Combinations of fumed silicas can also be used in preparing the adhesive composition.

Typically, the concentration of the fumed silica, component (c), added to the adhesive formulation can be in the range of from about 2 wt % to about 15 wt % in one embodiment; from about 4 wt % to about 12 wt % in another embodiment; from about 5 wt % to about 10 wt % in still another embodiment; and from about 6 wt % to about 8 wt % in yet another embodiment (unless otherwise stated, all concentrations set forth herein are expressed in terms of the weight percent of the component in question based on the adhesive composition as a whole).

To realize the rheological and wash-off resistance properties of the adhesive, it is important to adjust and control to a proper amount the mass ratio of hydrophobic fumed silica (component (II):liquid epoxy resin (component (I) in the epoxy adhesive composition. Advantageously, the adhesive composition of the present invention includes a high fumed silica to resin mass ratio. For example, the hydrophobic fumed silica:resin ratio can be equal to or >about 0.08 in one embodiment, from about 0.08 to about 0.14 in another embodiment, and from about 0.08 to about 0.10 in still another embodiment.

The adhesive composition of the present invention is preferably a one-part, single-component, or 1K composition. As is known in the art, a 1K epoxy adhesive contains all of the ingredients for the adhesive in a single composition, and does not cure until exposed to the appropriate conditions, such as heat or radiation, which activates a curing agent (hardener) present in the composition. The curing agent for a 1K adhesive composition, preferably comprises a latent curing agent that does not cause hardening under ambient conditions ("ambient conditions" meaning, e.g., typical room temperature and normal lighting conditions). A latent curing agent that causes the epoxy adhesive to be curable by application of heat is preferably used in the present invention, because typically, the epoxy adhesive is cured at elevated temperature after being stored for a period of time in unreacted form at ambient temperatures. Thus, the adhesive compositions of the present invention also contain one or more curing agents (hardeners) capable of accomplishing cross-linking or curing of the adhesive composition when the adhesive composition is heated to a temperature well in excess of room temperature. That is, the hardener is activated by heating.

In preparing the adhesive formulation of the present invention, one or more curing agents, as component (III), can be added to the adhesive composition of the present invention. The latent, heat-curing agent activated by elevated temperature can be combined with components (I) and (II) together; or the curing agent can be admixed into the liquid resin system, component (I), the solid material, component (II), or both components (I) and (II).

Any curing agent appropriate for a 1K adhesive may be used in the adhesive composition. For example, some hardeners useful in the present invention include dicyandiamide, imidazoles, amines, amides, polyhydric phenols, polyanhydrides, dihydrazides, and mixtures thereof. In one preferred embodiment for example, the curing agent can be dicyandiamide, such as Amicure CG-1200 Dicy available from Evonik, as component (d). Dicyandiamide is also known as Dicy, dicyanodiamide, and 1- or 2-cyanoguanidine. Dicy (CAS 461-58-5) has empirical formula $C_2N_4H_4$, molecular weight 84, and may be represented with the following structural formula:

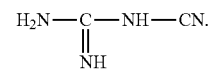

Any amount of curing agent may be used as appropriate for any particular 1K adhesive composition according to the present invention, and may be determined by one of ordinary skill in the art. For example, the concentration of the curing agent, component (d), added to the adhesive formulation can be in the range of from about 0.01 wt % to about 10 wt % in one embodiment; from about 0.1 wt % to about 10 wt % in another embodiment; and from about 1 wt % to about 5 wt % in still another embodiment. In other embodiments, the amount of curing agent, component (d), used in the present invention may preferably be ≥about 1 wt %, more preferably ≥about 2 wt %, more preferably ≥about 3 wt % of the epoxy adhesive. In still other embodiment, the amount of curing agent used in the present invention can be preferably less than or equal to (≤) about 5 wt %, and more preferably ≤about 4 wt % of the epoxy adhesive.

Other thermally-activatable or latent hardeners useful for the adhesive compositions of the present invention, may include for example, guanidines, substituted guanidines, substituted ureas, melamine resins, guanamine derivatives, cyclic tertiary amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. For single-component, solid, finely ground hardeners that have a low solubility at room temperature in the thermosetting adhesive system, are preferred to provide an adhesive composition with good storage stability.

In addition to, or instead of, the above-mentioned hardeners, catalytically-active substituted ureas may be used such as for example, p-chlorophenyl-N,N-dimethylurea (monuron), 3-phenyl-1,1-dimethylurea (fenuron) or 3,4-dichlorophenyl-N,N-dimethylurea (diuron). Catalytically active tertiary acryl- or alkyl-amines, such as benzyldimethylamine, tris(dimethylamino)phenol, piperidine or piperidine derivatives, may also be used. Typically, such amines, such as EP-796, are incorporated into the adhesive composition as complexes with phenolic-functionalized polymers for improved stability. EP796 is tris(2,4,6-dimethyl-aminomethyl)phenol in a polymer matrix, as is described in column 2, lines 39-57 and column 4, line 34 through column 6, line 54 of U.S. Pat. No. 4,659,779, incorporated herein by reference. Also useful in the present invention is an accelerin catalyst, as described in U.S. Patent Application Publication No. US20040131839A1.

The adhesive formulation of the present invention can include optional additives such as fillers, curing accelerators, other resins, and other materials which are known in the prior to function for their intended use. In preparing the adhesive formulation of the present invention, one or more optional materials/additives may be added to, or mixed in with, the liquid resin system component (I), to the solid material component (II), or to both components (I) and (II).

For example, in embodiments directed to improving the wash off resistance of an adhesive, it may also be desirable to include a filler. Suitable fillers useful in the present invention may include one or more fillers described in WO 2016108958 A1 incorporated herein by reference, such as for example calcium carbonate, calcium oxide, talc, coal tar, carbon black, textile fibers, glass particles in the form of fibers or spheres, hollow glass spheres, wollastonite, aramid pulp, boron fibers, carbon fibers, mineral silicates, mica, powdered quartz, hydrated aluminum oxide, bentonite, wollastonite, kaolin, fumed silica, silica aerogel, metal powders such as aluminum powder or iron powder, and mixtures thereof. Calcium carbonate can be used to reduce shrinkage and increase corrosion resistance. Calcium oxide is a humidity scavenger that may be used to help preserve a partially-cured epoxy adhesive prior to final curing. Aluminum magnesium silicate (wollastonite) such as Nyad® 200 and Nyglos 8 available from Nyco.

Among the fillers useful in the present invention, hollow glass spheres are used in one preferred embodiment, either singly or in some combination with other filler components. When hollow glass microspheres are present in the adhesive composition, the hollow glass microspheres may include the materials such as K25 Glass Bubbles available from Minnesota Mining & Manufacturing (3M) and Q-CEL 7028 available from Potters.

Typically, the adhesive composition may contain up to about 10 wt % (e.g., from about 0.5 wt % to about 5 wt %) of hollow glass microspheres; in other embodiments, however, the epoxy paste adhesive of the present invention is free of hollow glass microspheres.

The concentration of the filler present in the adhesive formulation can be in the amount of, or greater than, 0 wt %, about 0.3 wt %, or about 0.5 wt % in some embodiments. In other embodiments, the filler is present in the adhesive composition in an amount of, or less than, about 35 wt %, about 30 wt % or about 25 wt %. In still another embodiment, the filler can be present in the adhesive formulation in the range of from about 10 wt % to about 30 wt % in one embodiment; from about 15 wt % to about 30 wt % in another embodiment; and from about 20 wt % to about 30 wt % in still another embodiment.

The adhesive formulation of the present invention can include one or more curing accelerators. While the use of a curing accelerator is optional, it is beneficial to use a curing accelerator. When a latent curing agent is used, the curing accelerator is preferably present in sufficient amount to catalyze the curing reaction when exposed to conditions, e.g., temperatures, at which the latent curing agent catalyzes the curing process. When used, any suitable curing accelerator may be used, and may be selected by one having ordinary skill in the art. In some embodiments, the curing accelerators may include ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N,N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$ to $C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in U.S. Pat. No. 4,713,432 and EP 0197892). The curing accelerator may, for example, comprise a composition obtained from a combination of a high-boiling nitrogen base, and a phenolic polymer which is an addition polymer of a phenol bearing an unsaturated substituent. Particularly preferred curing accelerators include blocked tert-amines using polymeric phenols like poly(p-vinylphenol (PVP) or novolac. Another particularly preferred curing accelerator comprises 2,4,6-tris(dimethylaminomethyl)phenol integrated into a PVP matrix. Also, accelerators useful in the present invention may include accelerators disclosed in WO 2012006001, incorporated herein by reference.

The curing accelerator useful in the present invention may also include, for example, blocked tertiary amines (EP796 or EPCAT50 technology) such as a urea curing accelerator derived from an aromatic isocyanate and dimethylamine; or a urea curing accelerator derived from an aliphatic isocyanate and dimethylamine. Another curing accelerator useful in the adhesive formulation of the present invention may include phenolic-functional catalysts such as Accelerine CEL 2191, as described in detail in U.S. Pat. No. 7,084,210 B2, incorporated herein by reference.

Various imidazole derivatives, preferably solid imidazole derivatives, may also be used as catalytically-active accelerators. Examples of such accelerators include are 2-ethyl-2-methylimidazole, N-butylimidazole, benzimidazole and N—$C_1$ to $C_{12}$-alkylimidazoles or N-arylimidazoles.

The concentration of the curing accelerator present in the adhesive formulation can be in the amount of, or greater than, 0 wt %, about 0.3 wt %, or about 0.5 wt % in some embodiments. In other embodiments, the curing accelerator is present in the adhesive composition in an amount of, or less than, about 2 wt %, about 1.5 wt % or about 1.3 wt %. In still another embodiment, the accelerator can be in the range of from 0 wt % to about 2 wt %; from about 0.5 wt % to about 2 wt % in yet another embodiment; and from about 0.5 wt % to about 1 wt % in even still another embodiment.

The adhesive formulation of the present invention can include other optional liquid epoxy resin compounds. In one embodiment for example, the other liquid epoxy resin can be an epoxysilane such as RAM 1087 available from Huntsman and Silquest A-187 available from Momentive; also known as adhesion promoters. In another embodiment, the adhesive composition may include an epoxy-functional reactive diluent such as a mono-epoxide (e.g., monoglycidyl ethers of alkyl- and alkenyl-substituted phenols or long chain aliphatic alcohols, such as C8 to C20 straight chain saturated aliphatic alcohols). Generally, the adhesive composition may contain an amount of, or greater than, 0 wt % and up to about 30 wt % optional component (g). In general, one or more other optional liquid epoxy resin compounds or reactive diluents may be used in an amount effective to lower the viscosity of the epoxy paste adhesive to the desired level. The above optional liquid epoxy resin compounds and diluents can be added to the liquid epoxy resin component (I) or as a separate additive.

The adhesive formulation of the present invention can include other further optional adjuvants or additives. Suitable optional ingredients useful in the adhesive formulation may include both physical and chemical type agents. Other optional ingredients useful in the adhesive composition of the present invention may include for example a solid epoxy resin adduct (0-15 wt %); reactive diluents (0-10 wt %); other fillers, other toughening agents, curing catalysts, stable catalysts, color additives, dimerized fatty acids, reactive diluents, pigments, dyes, fire-retarding agents, thixotropic agents, expanding agents, flow control agents, adhesion promoters, antioxidants, viscosity modifiers, solvents, and mixtures thereof.

In one embodiment, the optional additive useful in the present invention can include for example an alternative thixotropic agent either as the sole thixotrope; or one or more thixotropic agents in combination with fumed silica. The thixotropic agents and other viscosity regulators useful in the present invention may include for a mixture of polyester and liquid epoxy resin (LER), such as Dynacol (25% polyester 7330 and 75% LER 330) which can improve wash-off resistance.

In still another embodiment, the optional additive useful in the present invention can include for example at least one surfactant or wetting agent. The wetting agent can be for example a non-ionic fluorinated polymer. Such wetting agents are also preferably capable of absorbing residual oils (e.g., manufacturing and processing oils) on metal surfaces, thereby facilitating adhesion to metal surfaces.

The concentration of an optional ingredient that may be used in the adhesive formulation can be in the range of from 0 wt % to about 15 wt % in one embodiment; from about 0.01 wt % to about 15 wt % in another embodiment; and from about 1 wt % to about 10 wt % in still another embodiment.

The process for making the adhesive composition of the present invention includes admixing the ingredients described above at a temperature of from about 25° C. to about 60° C. in one embodiment; from about 25° C. to about 50° C. in another embodiment; and from about 40° C. to about 50° C. in still another embodiment. For the epoxy paste adhesive to possess the desired rheological characteristics, it is important to control the mixing temperature so as to minimize unintentional advancement of the resin systems and/or prevent partial curing of the adhesive, which can have negative effects on the rheology and/or adhesive performance. In addition, the order of addition is carried out, preferably to produce a stable product. For example, in one embodiment, the ingredients are added early and adjusted. In another embodiment, the ingredients are added late to minimize thermal history. As used herein "stable" means a material that is rheologically stable, i.e., wherein the material exhibits a minimal increase in viscosity as a function of time at a specified temperature (usually in the range of from about 20° C. to about 50° C.).

The concentration of component (I), used in preparing the adhesive formulation of the present invention can be in the range of from about 20 wt % to about 80 wt % based on the weight of the adhesive formulation in one embodiment; and from about 30 wt % to about 60 wt % in another embodiment.

The concentration of component (II), used in preparing the adhesive formulation of the present invention can be in the range of from about 20 wt % to about 50 wt % based on the weight of the adhesive formulation in one embodiment; and from about 20 wt % to about 45 wt % in another embodiment; and from about 30 wt % to about 40 wt % in still another embodiment.

The adhesive composition of the present invention, when prepared in accordance with the present invention, is preferably resistant to removal, wash-off or breakage in subsequent processing steps. Without limiting the invention, possible subsequent processing steps include any or all of the following: washing, phosphate coating, painting, and/or e-coat baths.

The resulting adhesive composition product of the present invention produced by the above process is a mixture of components (I)-(III). When the components (I)-(III) are mixed together, the resulting material (adhesive product) is a paste consisting of well-dispersed components (I), (II) and (III). The adhesive paste product is stable at ambient conditions; and can be readily applied to a substrate. By "stable" it is meant that the adhesive product is flowable at ambient conditions and the individual components are inert to each other, i.e., the ingredients when mixed together do not react with each other to provide undesired side products.

Once the formulation of the present invention is prepared as described above, the formulation can be used in various applications. In one broad embodiment of the present invention, the formulation may be used as an adhesive for bonding two substrates. The adhesive formulation of the present invention can be applied to the surface of a substrate, for example, by brushing, calendaring, spraying, dipping, rolling or other conventional means.

The resulting benefits when the formulation is used as an adhesive includes for example, (1) an increase in wash-off resistance; (2) a retention of the bond strength of the adhesive; and (3) a pumpable rheology.

The greater the wash-off resistance property exhibited by an adhesive the better the adhesive performs as a structural adhesive especially when the adhesive is used as a crash durable adhesive. Performance enhancement in terms of wash-off resistance of an adhesive may be observed as an improvement in terms of an adhesive bead movement testing method herein referred to as the "spray wash-off test" method. In the spray wash-off test, a pressurized fluid jet stream is applied to a bead of the adhesive composition of the present invention. Generally, the fluid is water. However, depending on the application, a fluid other than water may be used, e.g., an aqueous solution, a mixture of water and organic solvent (with or without solutes), an organic solvent, air, and the like. The parameters used in the spray wash-off test will preferably be relevant to the particular assembly application, and can be determined by one of ordinary skill in the art.

The objective of the spray wash-off test is used to quantify the degree to which an adhesive bead moves on a surface of a substrate as the bead is subjected to high temperature and high shear. The spray wash-off test includes the steps of (1) applying an adhesive bead on an oily panel and then (2) subjecting the bead on the panel to an about 50 psi water stream at about 58° C. which is disposed at a distance of about 1 centimeter (cm) above the bead. The distance that the adhesive bead moves from the bead's original location on the panel can provide a quantitative measure of the wash-off resistance of an adhesive bead applied to a substrate surface such as an automobile part.

Any water pressure relevant to a particular application may be used in the spray wash-off test. For example, in some applications, the water pressure can be set to about 1 bar to about 3 bar (gauge) in one embodiment, and about 1.6 bar (gauge) or about 2 bar (gauge) can be used in the spray wash-off test in other embodiments.

Any water temperature relevant to a particular application may be used in the spray wash-off test. For example, in some applications, the water temperature can be in the range of about 50° C. to about 80° C. in one embodiment, and about 58° C. or about 60° C. can be used in the spray wash-off test in other embodiments.

Any angle of the water jet may be used in the spray wash-off test. For example, in some applications, the angle of the water jet can be set to about 45° to about 70°, relative to the perpendicular, can be used in the spray wash-off test in one embodiment, and for example about 60° in another embodiment.

In the spray wash-off test, the fluid jet may be applied to a bead for any length of time relevant to a particular application. For example, in some applications, the jet is applied to a bead for about 10 seconds to about 60 seconds in one embodiment, for about 20 seconds to about 40 seconds in another embodiment, and for about 30 seconds or about 40 seconds in still other embodiments.

Any distance from the tip of the nozzle to the surface of the bead may be used in the spray wash-off test. For example, in some applications, a distance of from about 25 cm to about 30 cm may be used in the spray wash-off test in one embodiment.

Any type of nozzle may be used in the spray wash-off test. For example, a nozzle provided by Lechler, e.g., Nozzle No. 617 044 16, and the like, is suitable for use in the spray wash-off test in one embodiment.

In one illustrative embodiment using the spray wash-off test of the present invention, the dimensions of the adhesive bead used in the above spray wash-off test method can be a ½ inch half circle (12.7 mm wide×6.4 mm high×125 mm long); the panel can be a 4 inches×12 inches hot dipped galvanized (HDG) rectangle mild steel panel (however, other substrates such as aluminum can be used) that is 0.8 mm thick (however, any thickness can be used); and the bead movement measurements include an average of 3 measurements per bead (at the center of the bead and about 25 mm from each end of the bead) and an average of 3 panels per adhesive bead can be preferably used. In the above spray wash-off test method, the bath specifications include the following: the temperature can be from about 55° C. to about 60° C.; an indirect impingement of about 1 cm above the bead can be used; the water pressure can be about 50 psi; the nozzle for the water stream can be a 65° fan; and the spray time of the water stream can be about 40 seconds. In the spray wash-off test, the adhesive moves down a panel and reaches a point where the adhesive material is not in direct contact with the stream of water. In general, the adhesive of the present invention does not wash off of the panel at all; that is, the bead of adhesive tends not to travel any distance under the conditions of the spray wash-off test.

In general, the wash-off resistance property of an adhesive formulation of the present invention may be increased when compared to an adhesive known in the prior art that does not have the proper rheological properties and the proper hydrophobic fumed silica loadings as described herein. The wash-off resistance property of the adhesive formulation via the above spray wash-off test may be improved over known common adhesives by about 3 times to about 5 times (from relative movement of bead). For example, an adhesive bead of the present invention may move on the order of from 0 mm to about 7 mm in one embodiment as compared to other known beads of pumpable adhesives that move on the order of from about 20 mm to about 25 mm under the same conditions. The ultimate objective of the present invention is to provide a pumpable adhesive that a bead of such adhesive will not move any distance when subjected to the above spray wash-off test, i.e., none of the adhesive will wash off the substrate. In terms of a percentage wash-off performance, the adhesive composition of the present invention should exhibit no more than slight (e.g., <about 5%) wash-off in one embodiment, and the adhesive composition should exhibit no wash-off (e.g., 0% wash-off) in another embodiment.

The greater the bonding strength property exhibited by an adhesive the better especially when the adhesive is used as a crash durable adhesive. Advantageously, the bonding strength property of an adhesive formulation of the present invention is good for used as a CDA in automobile applications. Generally, the bonding strength property of the adhesive formulation of the present invention can be measured in terms of lap shear strength, T-peel strength and impact peel strength. For example, in one general embodiment, the lap shear strength of the inventive CDA can be from about 20 MPa to about 30 MPa on a 1.6 mm Cold-Rolled Steel; the T-peel strength of the inventive CDA can be from about 6 N/mm to about 12 N/mm on a 0.8 mm Cold-Rolled Steel; and the impact peel strength at about 23°

C. of the inventive CDA can be from about 20 N/mm to about 40 N/mm on a 0.8 mm Cold-Rolled Steel.

When used as a crash durable adhesive, it is generally desired for the adhesive formulation of the present invention to be pumpable at about room temperature (about 25° C.). A benefit of using the formulated adhesive (i.e., the formulation with all of its components) of the present invention, includes a pumpable adhesive. By "pumpable" herein it is meant that the adhesive composition of the present invention has a desired rheology such that the composition can flow and be pumped by conventional pumping means. In general, "pumpability" is measured in terms of viscosity. Accordingly, the adhesive composition of the present invention is advantageously a liquid resin having a low viscosity at room temperature and thus the adhesive can be pumped and applied at room temperature. For example, in one embodiment the viscosity of the combined liquid components of the adhesive at a temperature of 15° C. may be generally <about 800 Pa·s, preferably <about 400 Pa·s in another embodiment, and more preferably <about 250 Pa·s in still another embodiment. In other embodiments, the viscosity of the adhesive at a temperature of 15° C. may be <about 4,500 Pa·s in one embodiment, <about 4,000 Pa·s in another embodiment, <about 3,500 Pa·s in still another embodiment; and <about 2,500 Pa·s in yet another embodiment.

In one preferred embodiment, the adhesive formulation of the present invention can be advantageously used for bonding together the same or dissimilar metal substrates; or for bonding metal to other substrates such as thermoplastic, thermosets, reinforced plastics, or glass. The process for bonding the substrates includes for example the steps of:

(1) admixing: (i) a liquid resin system including: (a) at least one epoxy resin, wherein the epoxy resin exhibits a minimal viscosity dependence on temperature; and (b) at least one toughener, wherein the toughener exhibits a minimal viscosity dependence on temperature; (ii) a solid material including: (c) at least one hydrophobic fumed silica at a high silica loading mass ratio of hydrophobic fumed silica (component (II)): liquid resin system (component (I)); and (iii) a curative material including: (d) at least one curing agent; wherein the epoxy-based crash durable adhesive composition exhibits a rheology of being pumpable when exposed to temperatures of at least to 15° C. and wherein the epoxy-based crash durable adhesive composition exhibits a wash-off resistance such that the adhesive does not flow more than about 7 mm on oily metal panels when exposed to spray wash-off testing conditions described herein to form a crash durable adhesive formulation;

(2) contacting the epoxy-based adhesive composition from step (1) to at least a portion of the surface of a first substrate prior to contacting the first substrate with another second substrate forming a layer of the adhesive of step (1) at a bondline between the two substrates to form an assembly, the layer in this step (2) having a predetermined thickness such as between about 0.1 mm and about 3 mm; wherein the bondline may contain solid spacers such as glass beads to maintain the adhesive layer thickness;

(3) contacting the first and second substrates via the layer of the epoxy-based adhesive composition at the bondline between the two substrates to form an assembly;

(4) subjecting the assembly of step (3) to a wash, spray and/or bath treatment(s); and (5) after step (4), curing the epoxy-based adhesive composition layer at the bondline by heating to a curing temperature sufficient to form a cured adhesive bonded to the two substrates at the bondline.

The above process advantageously increases the wash-off resistance property of the adhesive composition prior to the curing step and maintains while the bonding strength of the adhesive after cure remains the same or does not deteriorate significantly.

The adhesive composition of the present invention is suitable for adhering together parts made of different materials, including, for example, wood, metal, coated or pretreated metal, plastic, filled plastic, thermoset materials such as sheet molding compound and the like. The substrates to be joined using the adhesive may be the same as, or different from, each other. For example, the formulation of the present invention may be used as an adhesive for bonding a first substrate to a second substrate. The first and second substrates can be dissimilar substrates or the first and second substrates may be the same substrates. In one embodiment, the first substrate can be selected from metals such as aluminum, and ferrous-based metals such as for example carbon steel; and the second substrate can be selected from various types of substrates including, for example, metal such as aluminum and steel, glass, fabric, metal, rubber and composite materials. In a preferred embodiment, the second substrate is another metal such as aluminum.

In one embodiment, the adhesive composition of the present invention may be used for gluing metal parts and particularly for gluing steel sheets such as cold rolled steel sheets, electro-galvanized steel sheets, hot-dip galvanized steel sheets, galvannealed steel sheets and/or zinc/nickel-coated steel sheets, for example. The composition is especially useful for bonding substrates which, subsequent to the application of the adhesive but prior to heating and curing of the adhesive, will be contacted with liquid in the form of an aqueous bath or stream.

The adhesive composition of the present invention can be applied to a substrate surface by any technique known in the art. For example, adhesive composition can be applied by extrusion from a robot in bead form onto the substrate or by mechanical application methods such as a caulking gun or extruder, or any other manual application means, and can also be applied using a swirl or streaming technique. The swirl and streaming techniques utilize equipment well known in the art such as pumps, control systems, dosing gun assemblies, remote dosing devices and application guns. Generally, the adhesive composition may be applied to one or both of the substrates to be joined. The substrates are contacted such that the adhesive is located between the substrates to be bonded together. Thereafter, the adhesive composition is subjected to heating to a temperature at which the heat curable or latent curing agent initiates cure of the epoxy paste adhesive.

The epoxy paste adhesive of the present invention is formulated to be capable of being flowed or pumped to the work site at temperatures of, for example, from about 15° C. to about 45° C. In most applications, the adhesive is heated only up to a temperature at which the latent curing agent is not yet activated. To reduce the viscosity of the adhesive composition to a workable level (i.e., to render it capable of flowing as a liquid) it may be desirable to subject it to high shearing forces using suitable equipment. The composition may be applied directly to the substrate surface or may be allowed to flow into a space separating the substrates to be joined, such as in a hem flanging operation. An advantage of the present invention is that the adhesive need not be subjected to a precuring or gelling step wherein the adhesive, after being applied to the substrate surface, is heated to an intermediate temperature (i.e., above room temperature but below the final cure temperature) for a time effective to cause the adhesive to gel or cure to an extent effective to render the adhesive resistant to wash-off. That is, the epoxy paste adhesive of the present invention inherently has a yield value sufficiently high that a precuring or gelling step is not necessary, thereby simplifying the assembly processes in which such adhesive is used.

The epoxy paste adhesive of the present invention is preferably cured in an oven at a temperature which lies clearly above the temperature at which the composition was applied to the parts to be bonded and at or above the temperature at which the curing agent and/or accelerator are activated (i.e., the minimum temperature at which the curing agent becomes reactive towards the other components of the adhesive. For example, in the above curing step (4), the adhesive composition can be exposed to a temperature, and for a time, sufficient to cure the composition. Suitable temperatures and times can be readily determined by one of skill in the art for any particular application. In general, the curing temperature can be ≥about 130° C. in one embodiment and ≤about 210° C. in another embodiment. In a preferred embodiment, the curing temperature of the adhesive composition can be from ≥about 130° C. to ≤about 210° C. In general, the curing time can be ≥about 3 minutes (min), ≥about 5 min, or ≥about 10 min. In general, the curing time can be ≤about 20 min, ≤about 15 min, or ≤about 12 min.

One particularly preferred application for the adhesives according to the present invention is the formation of structural bonds in vehicle construction such as in hem flanges (e.g., bodyshell construction).

EXAMPLES

The following examples are presented herein to further illustrate the present invention in detail but are not to be construed as limiting the scope of the claims. Unless otherwise stated all parts and percentages are by weight.

Various terms and designations used in the examples which follow are explained hereinbelow in Table I.

TABLE I

Description of Components

| Component | Chemical Description of Component | Function of Component | Supplier |
|---|---|---|---|
| D.E.R. 331 | diglycidyl ether of bisphenol A (5% hydrolyzed); a bisphenol A based epoxy resin having an EEW between 182 and 192 | liquid epoxy resin (component (a)) | Olin Corp. |
| XZ92579 | blend of solid and liquid diglycidyl ethers of bisphenol A (as described in U.S. Patent Application Publication No. 20080251203A1 and WO2016007324A1, both incorporated herein by reference) | blend of liquid and solid epoxy resin (component (a)) | Olin Corp. |
| D.E.R. 732 | polypropylene oxide diglycidyl ether | liquid epoxy resin (component (a)) | Olin Corp. |
| Intermediate 171309 | blend of solid epoxy resin and liquid epoxy resin prepared through by a controlled conversion process as described in U.S. Pat. No. 6,555,628 B2, incorporated herein by reference | blend of liquid and solid epoxy resin (component (a)) | Olin Corp. |
| Intermediate 170400 | EO-BO-EO triblock copolymer-epoxy adduct. Described as "EP-EO-BO" in WO2016108958A1, incorporated herein by reference | liquid epoxy resin (component (a)) | Olin Corp./ TDCC* |
| Intermediate 170300 | CTBN-epoxy adduct as described in WO2016130455 A1, incorporated herein by reference (45 wt % CTBN) | liquid epoxy resin (component (a)) | Olin Corp./ TDCC |
| RAM F | PU-toughener derived from HDI, PTMEG - chain extended and capped with bisphenol A. Described as "INT LMB6633" in WO2016108958A1, incorporated herein by reference | toughener (component (b)) | Huntsman |
| RAM 965 | PU-toughener derived from HDI, PTMEG - chain extended and capped with o,o'-diallylbisphenol A. Described as "Flexibilizer DY 965" in WO2016108958A1, incorporated herein by reference | toughener (component (b)) | Huntsman |
| RAM DIPA | PU-toughener derived from HDI, PTMEG - chain extended with bisphenol A and capped with diisopropylamine. Described as "RAM DIPA" in WO2016108958A1, incorporated by reference | toughener (component (b)) | Huntsman |
| Toughener A | PU-toughener derived from HDI, 80:20 PTMEG:polyBD blend - 3.5% NCO prior to chain extension with o,o'-diallylbisphenol A and capped with cashew nut shell liquid | toughener (component (b)) | TDCC |
| Toughener B | PU-toughener derived from HDI, 80:20 PTMEG:polyBD blend - 4.5% NCO prior to chain extension with o,o'-diallylbisphenol A and capped with cashew nut shell liquid | toughener (component (b)) | TDCC |
| Toughener C | PU-toughener derived from HDI, 80:20 PTMEG:polyBD blend - 5.0% NCO prior to chain extension with o,o'-diallylbisphenol A and capped with cashew nut shell liquid | toughener (component (b)) | TDCC |
| Toughener D | PU-toughener derived from HDI, 75:25 PTMEG:polyBD blend - 4.5% NCO prior to chain extension with o,o'-diallylbisphenol A and capped with cashew nut shell liquid | toughener (component (b)) | TDCC |
| Toughener E | PU-toughener derived from HDI and PTMEG and capped with benzoxazolinone as described in U.S. Pat. No. 8,202,920, incorporated herein by reference | toughener (component (b)) | — |
| RAM 1087 | epoxysilane-9-[2-(2-methoxyethoxy)ethoxy]-9-[3-(oxiranylmethoxy)propyl]-2,5,8,10,13,16-hexaoxa-9-silaheptadecane | liquid epoxy resin (optional component (g)) | Huntsman |
| Silquest A-187 | epoxysilane-trimethoxy(3-(oxiran-2-ylmethoxy)propyl)silane | liquid epoxy resin (optional component (g)) | Momentive |
| Amicure CG-1200 Dicy | dicyandiamide | curing agent (component (d)) | Evonik |
| ED-70572 Violet | violet pigment in epoxy | pigment (optional component) | Plasticolors, Inc. |
| Sunbrite Red 254 | red pigment | pigment (optional component) | Sun Chemical |
| Araldite Red | red pigment in epoxy | pigment (optional component) | Huntsman |
| Araldite Blue | blue pigment in epoxy | pigment (optional component) | Huntsman |
| Quicklime CaO | calcium oxide | filler (optional component (e)) | Mississippi Lime Co. |

TABLE I-continued

Description of Components

| Component | Chemical Description of Component | Function of Component | Supplier |
|---|---|---|---|
| K25 Glass Bubbles | hollow glass spheres | filler (optional component (e)) | 3M |
| Q-CEL 7028 | hollow glass spheres | filler (optional component (e)) | Potters |
| Atomite | calcium carbonate | filler (optional component (e)) | Imerys Carbonates |
| Nyglos 8 | high aspect ratio wollastonite | filler (optional component (e)) | Nyco |
| Nyad 200 | low aspect ratio wollastonite | filler (optional component (e)) | Nyco |
| Cab-O-Sil TS-382 | fumed silica - surface treated with octylsilane | solid material (component (c)) | Cabot Corp. |
| Cab-O-Sil TS-720 | fumed silica - surface treated with PDMS | solid material (component (c)) | Cabot Corp. |
| Cab-O-Sil ULTRABOND | fumed silica - surface treated with PDMS | solid material (component (c)) | Cabot Corp. |
| Omicure U52-M | micronized dimethylurea curing accelerator | Accelerator (optional component (f)) | CVC Thermosets |

*The Dow Chemical Company

For purposes of describing the following examples, an adhesive resin composition having a viscosity at 15° C. of >4,000 Pa·s is considered herein as being challenging and difficult to pump and dispense by conventional robotic applicators. In the following examples, the viscosities reported herein were measured on an AR2000EX using a 25 mm parallel plate and a gap of 450 microns (μm). The viscosity data point of each of the adhesive resin compositions was taken after 180 seconds (s) of constant shear at a rate of 3 s$^{-1}$, unless noted otherwise.

In addition, in the following examples, wash-off is tested by applying a bead of an adhesive paste composition to an oil-coated metal panel and testing the bead in accordance with the spray wash-off test described above. Wash-off performance can be graded qualitatively by visual observation of the bead's travel distance on the panel as (1) no wash-off, (2) only slight wash-off, or (3) severe and unacceptable wash-off. By optimizing the two viscosity parameters shown in the Tables, any viscosity greater than 300 Pa·s at 58° C. can be considered to have an "improved wash-off" relative to conventional cold-applied CDAs. The results are described in the Tables below.

Comparative Examples A-C: Effect of Fumed Silica Grade and Solid Epoxy Resin Content The formulations of Comparative Examples A-C described in Table II contained a decreasing concentration of XZ29579; and the fumed silica used in the formulations was Cab-O-Sil TS-382. The dicyandiamide (dicy) content of the various sample formulations was modified so that the formulations contained a constant epoxy:dicy ratio. The results of these Comparative Examples indicate that Comparative Example A had reduced pumpability at 15° C. and poor wash-off resistance; and that Comparative Example B and Comparative Example C had good pumpability at 15° C., but had a poor wash-off resistance.

TABLE II

Rheological Evaluation of Cab-O-Sil TS-382 and Decreasing Amounts of XZ92579

| Ingredient | Comparative Example A (wt %) | Comparative Example B (wt %) | Comparative Example C (wt %) |
|---|---|---|---|
| XZ 92579 | 22.27 | 11.14 | — |
| DER331 | 22.25 | 33.15 | 44.06 |

TABLE II-continued

Rheological Evaluation of Cab-O-Sil TS-382 and Decreasing Amounts of XZ92579

| Ingredient | Comparative Example A (wt %) | Comparative Example B (wt %) | Comparative Example C (wt %) |
|---|---|---|---|
| Toughener B | 20.00 | 20.00 | 20.00 |
| RAM 1087 | 0.80 | 0.80 | 0.80 |
| ED-70572 Violet | 0.50 | 0.50 | 0.50 |
| Cab-O-Sil TS-382 | 6.20 | 6.20 | 6.20 |
| Dicy | 3.98 | 4.21 | 4.44 |
| Omicure U52M | 1.00 | 1.00 | 1.00 |
| K25 Glass Balloons | 1.00 | 1.00 | 1.00 |
| Nyglos 8 | 8.00 | 8.00 | 8.00 |
| Nyad 200 | 8.00 | 8.00 | 8.00 |
| Quicklime CaO | 6.00 | 6.00 | 6.00 |
| Total | 100.00 | 100.00 | 100.00 |
| Viscosity at 15° C. (3 1/s, Pa · s) | 3,819 | 2,311 | 1,446 |
| Viscosity at 58° C. (3 1/s, Pa · s) | 183.7 | 153.1 | 138.3 |

Examples 1-3

Various samples of resin formulation mixtures are described in Table III. Example 1-Example 3 described in Table III contained a decreasing concentration of solid epoxy. The fumed silica used in the formulation mixtures was Cab-O-Sil TS 720. The dicy content of the formulations was modified so that the formulations contained a constant epoxy:dicy ratio. The results of these Examples indicate that Example 1 had moderate pumpability at 15° C., but good wash-off resistance. The results of these Examples also indicate that Example 2 and Example 3 had good pumpability at 15° C., and moderate wash-off resistance.

TABLE III

Rheological Evaluation of Cab-O-Sil TS-720 and Decreasing Amounts of XZ92579

| Ingredient | Example 1 (wt %) | Example 2 (wt %) | Example 3 (wt %) |
|---|---|---|---|
| XZ 92579 | 22.27 | 11.14 | — |
| DER331 | 22.25 | 33.15 | 44.06 |
| Toughener B | 20.00 | 20.00 | 20.00 |

TABLE III-continued

Rheological Evaluation of Cab-O-Sil TS-720 and Decreasing Amounts of XZ92579

| Ingredient | Example 1 (wt %) | Example 2 (wt %) | Example 3 (wt %) |
|---|---|---|---|
| RAM 1087 | 0.80 | 0.80 | 0.80 |
| ED-70572 Violet | 0.50 | 0.50 | 0.50 |
| Cab-O-Sil TS-720 | 6.20 | 6.20 | 6.20 |
| Amicure CG-1200 Dicy | 3.98 | 4.21 | 4.44 |
| Omicure U52M | 1.00 | 1.00 | 1.00 |
| K25 Glass Balloons | 1.00 | 1.00 | 1.00 |
| Nyglos 8 | 8.00 | 8.00 | 8.00 |
| Nyad 200 | 8.00 | 8.00 | 8.00 |
| Quicklime CaO | 6.00 | 6.00 | 6.00 |
| Total | 100.00 | 100.00 | 100.00 |
| Viscosity at 15° C. (3 1/s, Pa · s) | 3,702 | 2,237 | 1,485 |
| Viscosity at 58° C. (3 1/s, Pa · s) | 357.8 | 302.0 | 292.6 |

Comparative Example D and Examples 4 and 5

Various samples of resin formulation mixtures are described in Table IV. Comparative Example D, Example 4, and Example 5 described in Table IV contained a decreasing concentration of solid epoxy. The fumed silica used in the formulation mixtures was Cab-O-Sil ULTRABOND. The dicy content of the formulations was modified so that the formulations contained a constant epoxy:dicy ratio. The results of these Examples indicate that Comparative Example D had poor pumpability at 15° C., but very good wash-off resistance. The results of these Examples also indicate that Example 4 and Example 5 had good pumpability at 15° C., and good wash-off resistance.

TABLE IV

Rheological Evaluation of Cab-O-Sil ULTRABOND and Decreasing Amounts of XZ92579

| Ingredient | Comparative Example D (wt %) | Example 4 (wt %) | Example 5 (wt %) |
|---|---|---|---|
| XZ 92579 | 22.27 | 11.14 | — |
| DER331 | 22.25 | 33.15 | 44.06 |
| Toughener B | 20.00 | 20.00 | 20.00 |
| RAM 1087 | 0.80 | 0.80 | 0.80 |
| ED-70572 Violet | 0.50 | 0.50 | 0.50 |
| Cab-O-Sil ULTRABOND | 6.20 | 6.20 | 6.20 |
| Amicure CG-1200 Dicy | 3.98 | 4.21 | 4.44 |
| Omicure U52M | 1.00 | 1.00 | 1.00 |

TABLE IV-continued

Rheological Evaluation of Cab-O-Sil ULTRABOND and Decreasing Amounts of XZ92579

| Ingredient | Comparative Example D (wt %) | Example 4 (wt %) | Example 5 (wt %) |
|---|---|---|---|
| K25 Glass Balloons | 1.00 | 1.00 | 1.00 |
| Nyglos 8 | 8.00 | 8.00 | 8.00 |
| Nyad 200 | 8.00 | 8.00 | 8.00 |
| Quicklime CaO | 6.00 | 6.00 | 6.00 |
| Total | 100.00 | 100.00 | 100.00 |
| Viscosity at 15° C. (3 1/s, Pa · s) | 4,300 | 2,987 | 1,891 |
| Viscosity at 58° C. (3 1/s, Pa · s) | 383.2 | 388.9 | 342.1 |

Collectively, the results obtained in the above Examples described in Tables II-IV indicate that a low viscosity resin system affords the opportunity to formulate an adhesive composition of the present invention to provide an adhesive composition having an acceptable balance of pumpability at low temperature and an improved wash-off resistance. Also, with regard to wash-off resistance, the adhesive compositions of the present invention show a clear advantage over the adhesives of the Comparative Examples.

Experimental Runs 1-6: Effect of PU Toughener Rheology on Formulation Viscosity

Figure 2:
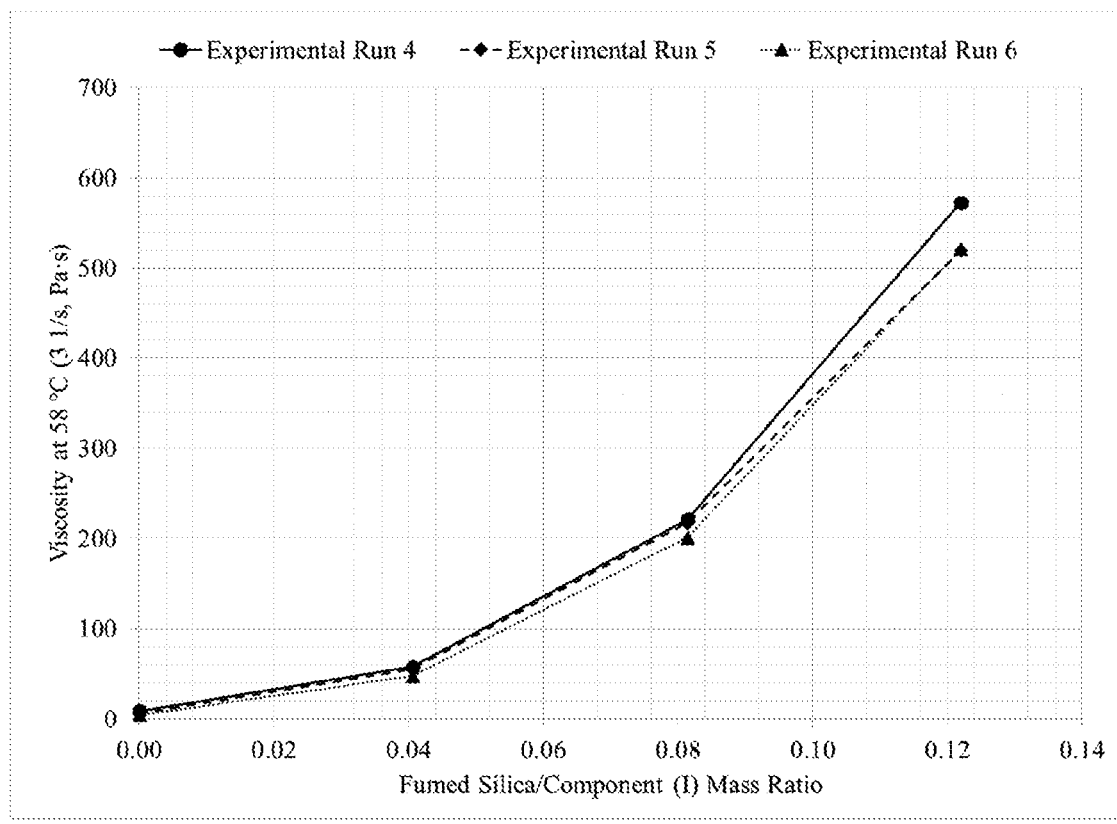

The first five components of the Examples described in Table IV above make up the liquid resin system, component (I), of the present invention. The viscosities of component (I) of Comparative Example D, Example 4, and Example 5 were measured at 15° C. with fumed silica:component (I) mass ratios ranging from 0.000-0.122; and are labeled in Table V as Experimental Run 1, Experimental Run 2, and Experimental Run 3, respectively. The viscosities of Component (I) of Comparative Example D, Example 4, and Example 5 were also measured at 58° C. with fumed silica:component (I) mass ratios ranging from 0.000-0.122; and are labeled in Table VI as Experimental Run 4, Experimental Run 5, and Experimental Run 6, respectively. The results of viscosity versus fumed silica:component (I) ratio are shown graphically for Experimental Runs 1-3 in FIG. 1 and for Experimental Runs 4-6 in FIG. 2. The observed relationship of viscosity to increasing the fumed silica: component (I) mass ratio is exponential at both 15° C. and 58° C. However, the data of these Experimental Runs collectively demonstrates that the viscosity at 15° C. is heavily dependent the XZ92579 concentration, but the XZ92579 concentration has a minimal effect on the viscosity at 58° C.

TABLE V

Experimental Runs 1-3

| Ingredient | Experimental Run 1 (wt %) | Experimental Run 2 (wt %) | Experimental Run 3 (wt %) |
|---|---|---|---|
| DER331 | 33.81 | 50.54 | 67.53 |
| XZ92579 | 33.83 | 16.98 | — |
| Toughener B | 30.38 | 30.50 | 30.49 |
| RAM 1087 | 1.22 | 1.22 | 1.22 |
| ED-70572 Violet | 0.76 | 0.76 | 0.76 |
| Total | 100.00 | 100.00 | 100.00 |
| Mass of Cab-O-Sil | Viscosity at 15° C. | Viscosity at 15° C. | Viscosity at 15° C. |

TABLE V-continued

Experimental Runs 1-3

| Ingredient | Experimental Run 1 (wt %) | Experimental Run 2 (wt %) | Experimental Run 3 (wt %) |
|---|---|---|---|
| ULTRABOND per 100 g component (I) (Fumed Silica:component (I) Mass Ratio) | (3 1/s, Pa · s) | (3 1/s, Pa · s) | (3 1/s, Pa · s) |
| 0.00 g (0.000) | 626.5 | 321.7 | 202.9 |
| 2.03 g (0.0406) | 947.3 | 567.9 | 381.1 |
| 8.14 g (0.0814) | 1592 | 1036 | 801.3 |
| 12.20 g (0.122) | 2847 | 1862 | 1557 |

TABLE VI

Experimental Runs 4-6

| Ingredient | Experimental Run 4 (wt %) | Experimental Run 5 (wt %) | Experimental Run 6 (wt %) |
|---|---|---|---|
| DER331 | 33.81 | 50.54 | 67.53 |
| XZ92579 | 33.83 | 16.98 | — |
| Toughener B | 30.38 | 30.50 | 30.49 |
| RAM 1087 | 1.22 | 1.22 | 1.22 |
| ED-70572 Violet | 0.76 | 0.76 | 0.76 |
| Total | 100.00 | 100.00 | 100.00 |
| Mass of Cab-O-Sil ULTRABOND per 100 g component (I) (Fumed Silica:component (I) Mass Ratio) | Viscosity at 58° C. (3 1/s, Pa · s) | Viscosity at 58° C. (3 1/s, Pa · s) | Viscosity at 58° C. (3 1/s, Pa · s) |
| 0.00 g (0.000) | 9.050 | 5.950 | 4.480 |
| 2.03 g (0.0406) | 57.91 | 55.76 | 47.23 |
| 8.14 g (0.0814) | 221.2 | 217.1 | 200.9 |
| 12.20 g (0.122) | 572.7 | 519.4 | 521.1 |

Figure 3:
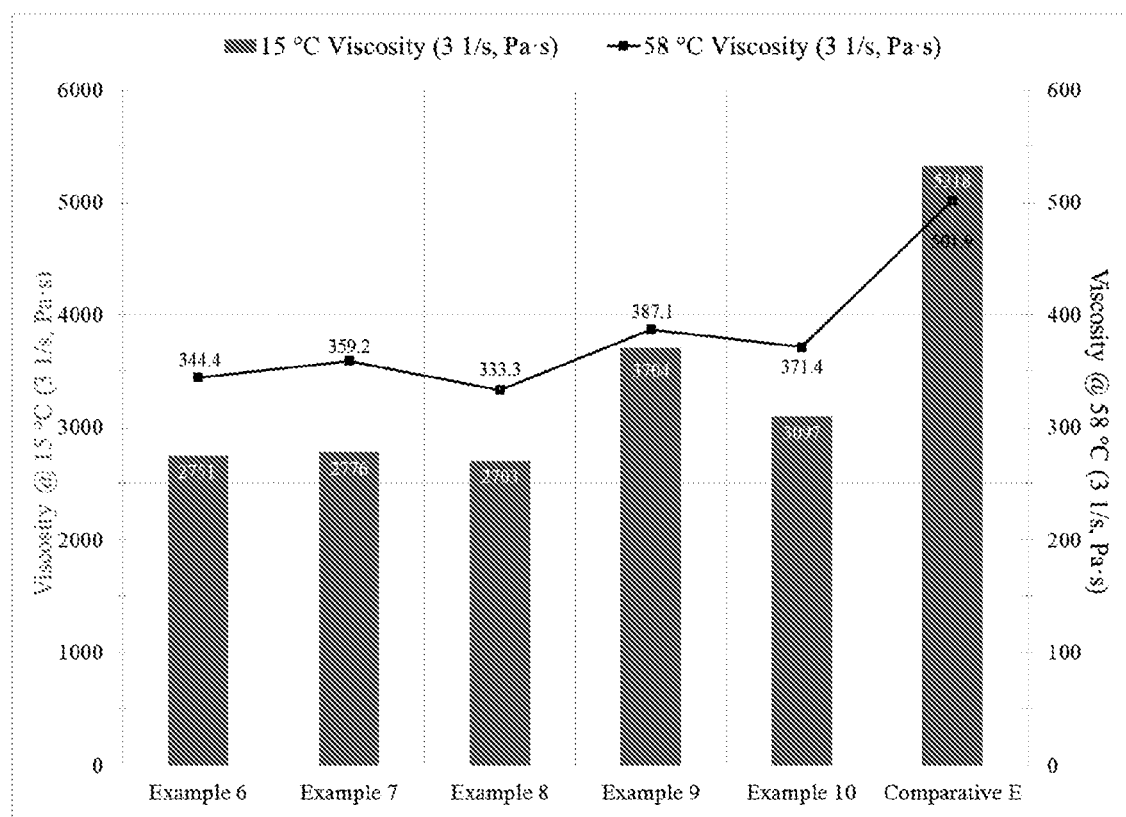
FIG. 3 is a graphic illustration showing the effect of polyurethane tougheners on an adhesive's viscosity at 15° C. and 58° C.

Comparative Example E and Examples 6-10: Effect of PU Toughener Rheology on Formulation Viscosity Table VII describes various formulation mixtures of adhesive compositions containing different blocked polyurethane tougheners and the resulting viscosities of such formulation mixtures. The toughener used in these Examples is present at ~20% so that adhesive composition can achieve the required toughness to generally be considered a CDA. Thus, the toughener can play a significant role in the formulation's viscosity. The graph in FIG. 3 illustrates the effects of a selected toughener on the rheology balance of the formulation tested. By this analysis Example 7, and Toughener D, offers an optimal rheology balance.

TABLE VII

Formulations Containing Various PU-Based Tougheners

| Ingredient | Comparative Example E (wt %) | Example 6 (wt %) | Example 7 (wt %) | Example 8 (wt %) | Example 9 (wt %) | Example 10 (wt %) |
|---|---|---|---|---|---|---|
| XZ 92579 | 11.14 | 11.14 | 11.14 | 11.14 | 11.14 | 11.14 |
| DER331 | 33.15 | 33.15 | 33.15 | 33.15 | 33.15 | 33.15 |
| RAM F | 20.00 | — | — | — | — | — |
| Toughener B | — | 20.00 | — | — | — | — |
| Toughener D | — | — | 20.00 | — | — | — |
| Toughener C | — | — | — | 20.00 | — | — |
| Toughener A | — | — | — | — | 20.00 | — |
| Toughener E | — | — | — | — | — | 20.00 |
| RAM 1087 | 0.80 | 0.80 | 0.80 | 0.80 | 0.80 | 0.80 |
| ED-70572 Violet | 0.50 | 0.50 | 0.50 | 0.50 | 0.50 | 0.50 |
| Cab-O-Sil ULTRABOND | 6.20 | 6.20 | 6.20 | 6.20 | 6.20 | 6.20 |
| Amicure CG-1200 Dicy | 4.21 | 4.21 | 4.21 | 4.21 | 4.21 | 4.21 |
| Omicure U52M | 1.00 | 1.00 | 1.00 | 1.00 | 1.00 | 1.00 |
| K25 Glass Balloons | 1.00 | 1.00 | 1.00 | 1.00 | 1.00 | 1.00 |

TABLE VII-continued

Formulations Containing Various PU-Based Tougheners

| Ingredient | Comparative Example E (wt %) | Example 6 (wt %) | Example 7 (wt %) | Example 8 (wt %) | Example 9 (wt %) | Example 10 (wt %) |
|---|---|---|---|---|---|---|
| Nyglos 8 | 8.00 | 8.00 | 8.00 | 8.00 | 8.00 | 8.00 |
| Nyad 200 | 8.00 | 8.00 | 8.00 | 8.00 | 8.00 | 8.00 |
| Quicklime CaO | 6.00 | 6.00 | 6.00 | 6.00 | 6.00 | 6.00 |
| Total | 100.00 | 100.00 | 100.00 | 100.00 | 100.00 | 100.00 |
| Viscosity at 15° C. (3 1/s, Pa · s) | 5,318 | 2,751 | 2,776 | 2,703 | 3,704 | 3,097 |
| Viscosity at 58° C. (3 1/s, Pa · s) | 501.9 | 344.4 | 359.2 | 333.3 | 387.4 | 371.4 |

Examples 11-13—Effect of Fumed Silica Concentration on Formulation Viscosity

Table VIII describes various formulation mixtures of adhesive compositions of the present invention. Table VIII describes the effect of removing solid epoxy resin from the formulation mixtures and increasing the fumed silica content of such formulations. By completely removing solid epoxy from the formulation mixtures, such formulations become pumpable at 15° C. Also, when the fumed silica content is increased from 6.20 wt % to 8.20 wt % the formulations almost double in viscosity at 58° C., which indicates excellent wash-off resistance.

TABLE VIII

Formulations Containing High Fumed Silica Content and Solid Epoxy Resin Omitted

| Ingredient | Example 11 (wt %) | Example 12 (wt %) | Example 13 (wt %) |
|---|---|---|---|
| XZ 92579 | — | — | — |
| DER331 | 45.11 | 45.11 | 45.11 |
| Toughener D | 20.00 | 20.00 | 20.00 |
| Silquest A-187 | 0.20 | 0.20 | 0.20 |
| Sunbrite Red 254 | 0.20 | 0.20 | 0.20 |
| Cab-O-Sil ULTRABOND | 6.20 | 7.20 | 8.20 |
| Amicure CG-1200 Dicy | 3.39 | 3.39 | 3.39 |
| Omicure U52M | 1.00 | 1.00 | 1.00 |
| Q-CEL 7028 | 1.90 | 1.90 | 1.90 |
| Nyad 200 | 8.00 | 7.50 | 7.00 |
| Atomite | 8.00 | 7.50 | 7.00 |
| Quicklime CaO | 6.00 | 6.00 | 6.00 |
| Total | 100.00 | 100.00 | 100.00 |
| Viscosity at 15° C. (3 1/s, Pa · s) | 1,903 | 2,268 | 2,670 |
| Viscosity at 58° C. (3 1/s, Pa · s) | 296.7 | 427.2 | 577.9 |

Experimental Runs 7-10

Figure 4:
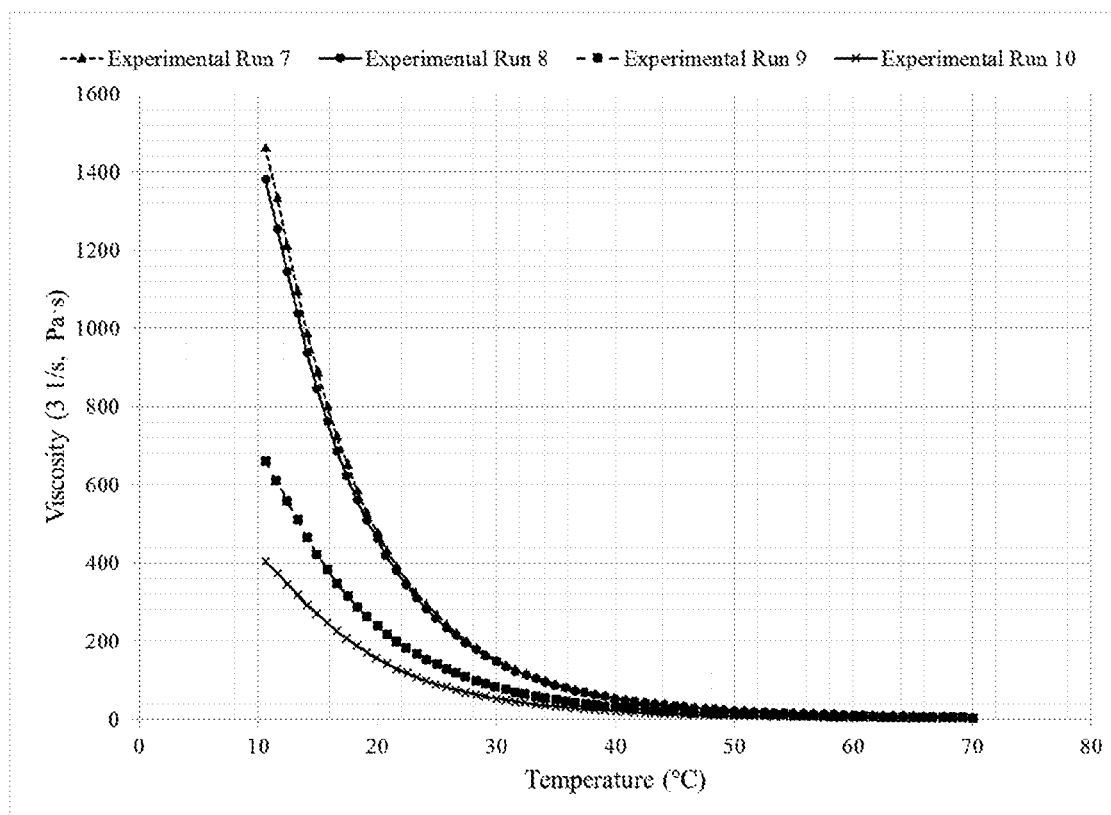
FIG. 4 is a graphic illustration showing the relationship of viscosity to temperature for resin systems of comparative adhesive examples and of present invention adhesive examples.

In a series of tests described as Experimental Runs 7-10 in Table IX, data for each of the formulation materials described in Table IX related to viscosity versus temperature was collected on an AR2000EX equipped with a peltier plate and a steel 25 mm parallel plate. Each of the materials were added to the peltier plate which was cooled to 10° C., and the steel 25 mm parallel plate was lowered to a trim gap of 475 µm. Any excess material was removed and the material was allowed to equilibrate at 10° C. for 1 min. The viscosity of the material was then collected from 10° C. to 70° C. at a ramp rate of 5° C./min and at a constant shear rate of 3 1/s. Data was collected at 10 s intervals and recorded as described in Table IX and FIG. 4. The data in Table IX shows the relationship between the viscosity of the liquid resin system (component (I)) and temperature. Experimental Run 7 utilizes the component (I) of Comparative Example E. Experimental Run 8 utilizes the component (I) of Example D. Experimental Run 9 utilizes the component (I) of Example 7. Experimental Run 10 utilizes the component (I) of Examples 11, 12, and 13.

TABLE IX

Viscosity vs. Temperature

| Ingredient | Experimental Run 7 (wt %) | Experimental Run 8 (wt %) | Experimental Run 9 (wt %) | Experimental Run 10 (wt %) |
|---|---|---|---|---|
| XZ 92579 | 16.98 | 33.83 | 16.98 | — |
| DER331 | 50.54 | 33.80 | 50.54 | 69.07 |
| RAM F | 30.49 | — | — | — |
| Toughener B | — | 30.39 | — | — |
| Toughener D | — | — | 30.49 | 30.62 |
| RAM 1087 | 1.22 | 1.22 | 1.22 | — |
| ED-70572 Violet | 0.76 | 0.76 | 0.76 | — |
| Siliquest A-187 | — | — | — | 0.31 |
| Total | 100.00 | 100.00 | 100.00 | 100.00 |
| Viscosity at 15° C. (Pa · s) | 889.6 | 846.0 | 421.2 | 269.2 |
| Viscosity at 60° C. (Pa · s) | 11.27 | 10.9 | 6.793 | 5.028 |

What is claimed is:

1. An epoxy-based crash durable adhesive composition comprising:
   (I) a liquid resin system comprising:
      (a) at least one epoxy resin; and
      (b) at least one polyurethane toughener capped with cashew nut shell liquid;
      wherein the viscosity of the liquid resin system, component (I), is less than about 800 Pa·s at a temperature of about 15° C.; and wherein the viscosity of the liquid resin system, component (I), is greater than about 5 Pa·s at a temperature of about 60° C.;
   (II) a solid material comprising:
      (c) at least one hydrophobic fumed silica, wherein the at least one hydrophobic fumed silica is present in the adhesive composition at a concentration of greater than 5 weight percent; and
   (III) a curative material comprising:
      (d) at least one latent heat-activated curing agent;
   wherein the rheology of the epoxy-based crash durable adhesive composition is such that the adhesive composition is pumpable at a temperature of about 15° C. or greater;
   wherein the weight ratio of the hydrophobic fumed silica in the solid material, component (II), to the liquid resin system, component (I), is from about 0.08 to about 0.14.

2. The adhesive composition of claim 1, wherein the at least one epoxy resin, component (a), is at least one liquid epoxy resin derived from bisphenol A or bisphenol F; and/or a blend of at least one liquid epoxy resin derived from bisphenol A or bisphenol F with at least one solid epoxy resin derived from bisphenol A or epoxy novolac resin.

3. The adhesive composition of claim 1, wherein the at least one hydrophobic fumed silica, component (c), is a fumed silica treated with at least one grade of poly(dimethylsiloxane).

4. The adhesive composition of claim 1, wherein the at least one curing agent, component (d), is dicyandiamide.

5. The adhesive composition of claim 1, wherein the wash-off resistance of the adhesive composition is such that the adhesive does not flow more than about 7 millimeters on oily metal panels when exposed to spray wash-off testing conditions.

6. The adhesive composition of claim 1, wherein the adhesive composition further comprises one or more of: (e) at least one filler; (f) at least one curing accelerator; and (g) at least one liquid resin different from component (a).

7. A pumpable and wash-off resistant epoxy paste adhesive for bonding automotive parts, comprising the epoxy-based crash durable adhesive composition of claim 1.

* * * * *